United States Patent [19]

Iwashita et al.

[11] Patent Number: 4,984,149
[45] Date of Patent: Jan. 8, 1991

[54] MEMORY ACCESS CONTROL APPARATUS

[75] Inventors: Takashi Iwashita, Saitama; Koichi Awazu; Kiyoshi Murase, both of Tokyo, all of Japan

[73] Assignee: Kabushiki Kaisha Toshiba, Kawasaki, Japan

[21] Appl. No.: 173,819

[22] Filed: Mar. 28, 1988

[30] Foreign Application Priority Data

Mar. 28, 1987 [JP] Japan ............................. 62-74829
Aug. 27, 1987 [JP] Japan ............................. 62-211466

[51] Int. Cl.⁵ ....................................... G06F 12/00
[52] U.S. Cl. .............................. 364/200; 364/248.1; 364/243.2; 364/255.1
[58] Field of Search ... 364/200 MS File, 900 MS File; 365/230.01, 238.5

[56] References Cited

U.S. PATENT DOCUMENTS

| | | | |
|---|---|---|---|
| 3,940,951 | 3/1976 | Christiansen | 364/900 |
| 4,115,850 | 9/1978 | Houston et al. | 364/200 |
| 4,145,745 | 3/1979 | DeBijl et al. | 364/200 |
| 4,399,503 | 8/1983 | Hawley | 364/200 |

Primary Examiner—Michael R. Fleming
Assistant Examiner—Debra A. Chun
Attorney, Agent, or Firm—Oblon, Spivak, McClelland, Maier & Neustadt

[57] ABSTRACT

A memory access control apparatus according to the present invention which controls an IC memory of which is under the control of a BIOS in the same manner as in a normal disk unit. External file units including the IC memory, a floppy disk unit, a hard disk unit, and the like are assigned a series of drive numbers. Registers store parameters for using the IC memory as an external file, and an access address and a transfer length of the IC memory are expressed in a sector form. The BIOS receives the access address and the parameters, translates the address into a byte form address, and transfers data to a corresponding area.

14 Claims, 7 Drawing Sheets

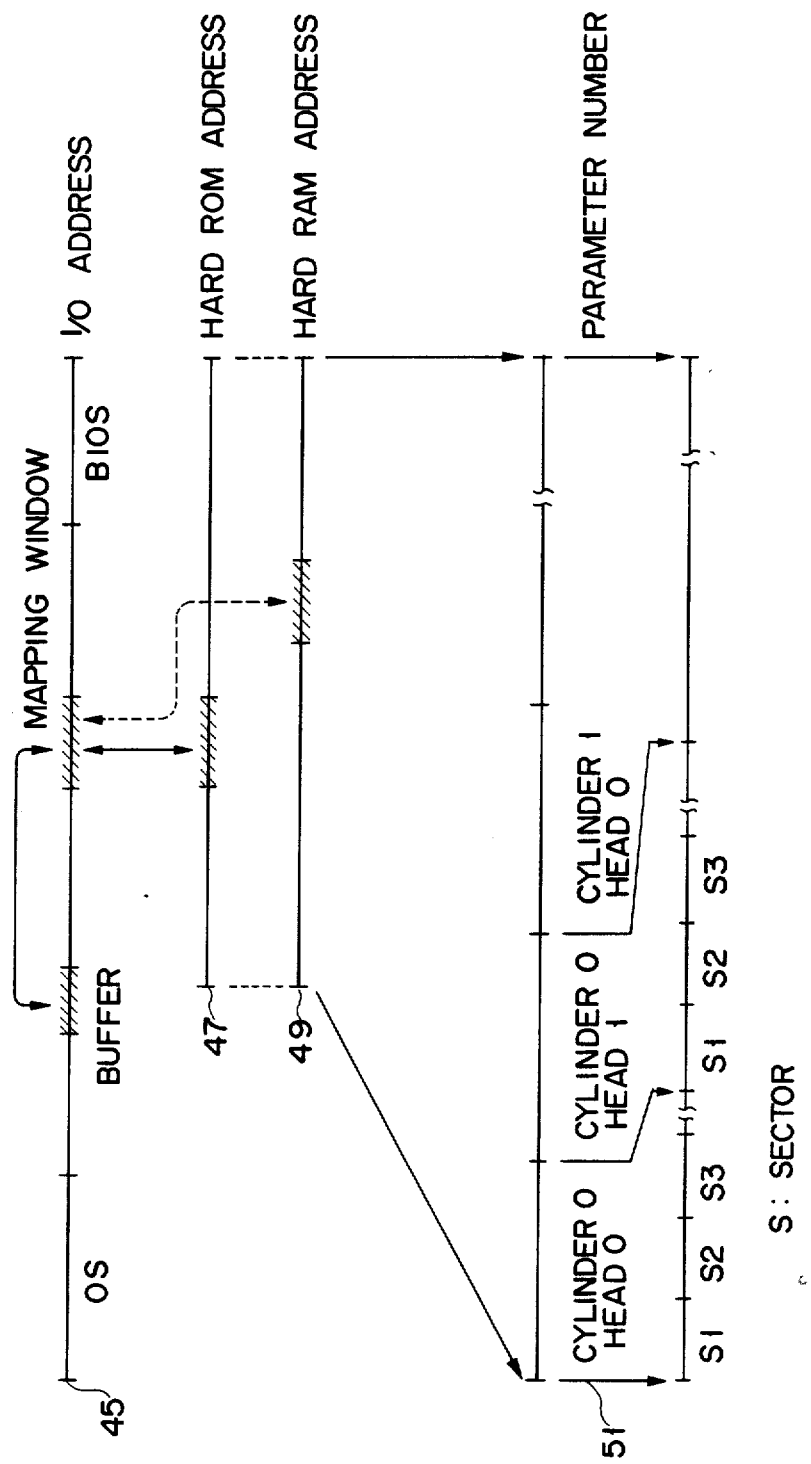
F I G. 8

MEMORY ACCESS CONTROL APPARATUS

BACKGROUND OF THE INVENTION

1. Field of the Invention

The present invention relates to a memory access control apparatus suitable for a personal computer.

2. Description of the Related Art

In a conventional computer system having a relatively small capacity such as a personal computer, when a large-capacity file is to be accessed at high speed, a hard disk unit is generally used. However, when a hard disk unit is used in a portable personal computer driven by a battery, the following problems are posed:

(i) Since a motor must be constantly rotated in the hard disk unit, a current consumption is large, and the service life of the battery is short.

(ii) In order to eliminate the problem of item (i), the motor may be automatically stopped when the hard disk is not used and be restarted when it is used. In this case, however, an access time is prolonged, or the service life of the hard disk is shortened because the frequency of vertical movement of the head is increased.

(iii) The portable personal computer is more likely subjected to the influence of vibrations or a shock and the hard disk is more likely to crash.

For these reasons, an architecture called a RAM disk or a virtual disk (to be simply referred to as a RAM disk hereinafter) has been developed. In this system, a data access is made by using a physical memory address space as a disk unit. This system allows processing at a speed higher than in a floppy disk unit or a hard disk unit by utilizing the characteristics of an IC memory. FIG. 1 shows the principle of a RAM disk system from the viewpoint of software. Application program 1 transfers control to the MS-DOS 3 through a DOS interface program such as the MS-DOS (disk operation system) interface program available from Microsoft Corporation. If a control command from application program 1 is supplied to floppy disk drive (FDD) 7 or hard disk drive (HDD) 9, MS-DOS 3 transfers control to ROM-BIOS (basic input/output system) 5 by executing interrupt instruction INT 13H (e.g., a software interrupt in a 16-bit microprocessor 8086 system available from Intel Corporation) of the ROM-BIOS interface program. ROM-BIOS 5 performs input/output control with respect to FDD 7 or HDD 9. When a RAM disk in main memory 13 is to be accessed, DOS 3 transfers control to RAM disk driver 11. RAM disk driver 11 accesses main memory 13.

However, according to the conventional system shown in FIG. 1, since RAM disk driver 11 is incorporated in MS-DOS 3 as an optional driver, the following drawbacks are posed:

(i) It is compatible with a normal disk unit through a DOS interface, but not compatible through ROM-BIOS 5. For this reason, some programs cannot access the RAM disk in the same manner as in a normal disk unit.

(ii) Since a memory access means is incorporated in the system as an optional driver of the MS-DOS, the RAM disk area is initialized when the DOS is started.

In addition, if a personal computer is equipped with only a single floppy disk, a DOS disk must be inserted into a floppy disk drive every time the DOS is started, or control is transferred from the application program to DOS.

SUMMARY OF THE INVENTION

It is an object to the present invention to provide a memory access control apparatus which can control a memory through a BIOS in the same manner as in a normal disk unit so that compatibility with the normal disk unit can be improved.

It is another object of the present invention to provide a memory access control apparatus wherein a DOS can be used as a ROM, and starting of the DOS or loading of DOS commands can be performed from the ROM.

In order to achieve the above object, there is provided a memory access control apparatus comprising:

external file units including an integrated circuit (IC) disk unit, which uses a random access memory (RAM) as part or a disk to be managed by a disk operation system, and a read only memory (ROM) as the other part of the disk, and which is expressed by an access address and a transfer length sector form;

access request determining means for determining whether an access request is directed to said IC disk unit when the access request is supplied to said external files; and address translating means for translating the sector form address into a byte form address when said access request determining means determines that the access request is directed to said IC disk unit.

According to the present invention, there is provided a memory access control apparatus which can control a memory through a BIOS in the same manner as in a normal disk unit so as to improve compatibility with the normal disk unit.

Accordingly, the function of a conventional floppy disk or hard disk is realized using an IC memory and a small-sized, lightweight machine body can be obtained. Furthermore, power consumption can be reduced compared with the disk unit. Since the DOS is used as a hard ROM, a DOS floppy need not be carried with the machine, or diskets need not be exchanged every time a DOS command is used. An IC disk is not rotated when it is used, and resistance to environment is improved. Since the IC disk requires no mechanical components, limitations in size and shape are reduced. The IC disk can be accessed at a speed 10 times higher than that of the floppy disk and twice that of the hard disk. Compatibility of disk access is improved compared with the RAM disk system.

BRIEF DESCRIPTION OF THE DRAWINGS

FIG. 8 is a view showing address assignment of the IC disk used in the memory access control apparatus according to the present invention;

DETAILED DESCRIPTION OF THE PREFERRED EMBODIMENTS

Figure 2:
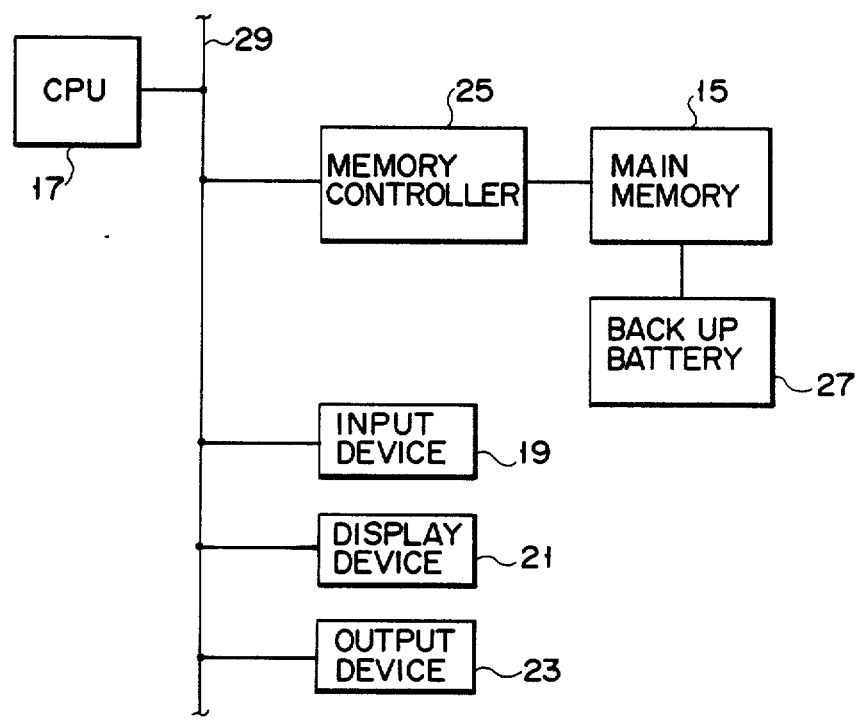
FIG. 2 is a block diagram of a memory access control apparatus according to an embodiment of the present invention.

FIG. 2 is a block diagram of a memory access control apparatus according to the present invention. Main memory 15 stores the MS-DOS available from Microsoft Corporation and basic input/output system BIOS as a disk operation system (DOS). CPU 17 controls input device 19, display device 21, and output device 23 in accordance with the MS-DOS and basic input/output system BIOS stored in main memory 15. A disk area is assigned to a partial or entire area in main memory 15. Memory controller 25 controls main memory 15 under the control of CPU 17. Memory controller 25 is constituted by, e.g., a map register, page control register, and memory control circuit. Memory controller 25 translates an access address supplied through the BIOS into a real address. Backup battery 27 backs up main memory 12 constituted by a RAM (holds data even when a power source of the system is turned off). Input device 19 is constituted by, e.g., a keyboard and a keyboard controller, through which data is input. Display device 21 comprises, e.g., an LCD display section and a display controller. Output device 23 comprises, e.g., a printer and a printer controller, through which data is output. Memory controller 25, input device 19, display device 21, and output device 23 are connected to CPU 17 through CPU bus 29.

Figure 1:
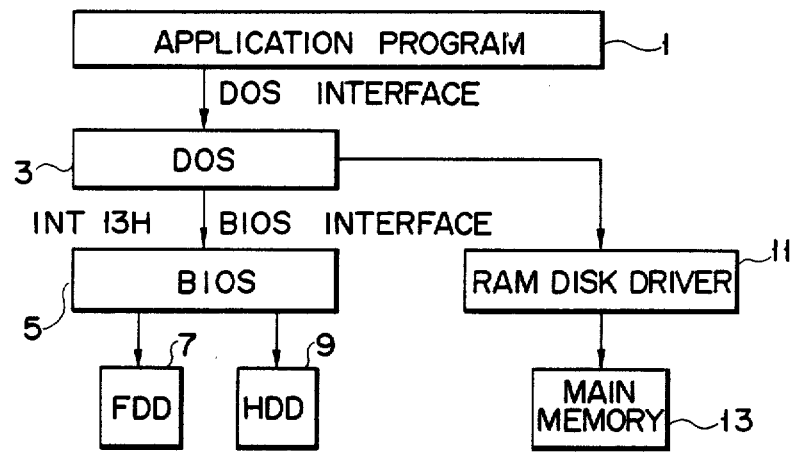
FIG. 1 is a view showing the principle of a conventional RAM disk system from the viewpoint of software.
Figure 3:
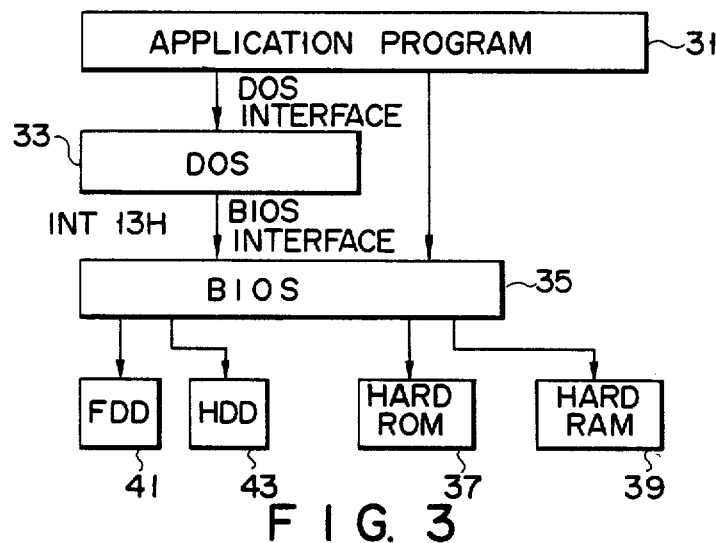
FIG. 3 is a view showing the principle of an IC disk system according to the present invention from the viewpoint of software.

FIG. 3 shows the principle of the embodiment of the present invention from the viewpoint of software. Control command information from application program 31 is supplied to DOS 33 (e.g., MS-DOS) through a DOS interface, or directly supplied to BIOS 35. DOS 33 controls FDD (floppy disk drive) 41, HDD (hard disk drive) 43, hard ROM 37, or hard RAM 39 by executing instruction INT 13H (described in detail later) of the BIOS interface. DOS 33 performs system management and memory management. BIOS 35 controls ROM and RAM areas as a disk. Hard ROM 37 is the ROM area to be controlled as a disk unit, and hard RAM 39 is the RAM area to be controlled as a disk unit. Hard RAM 39 is backed up by a battery, and data is held even if a power source of the system is turned off. Hard ROM and RAM 37 and 39 are generally called an IC disk. Application program 31 and DOS 33 are the same as conventional ones. The system in FIG. 3 is different from that in FIG. 1 in that an IC disk driver is incorporated in BIOS 35, application program 31 and BIOS 35 are directly coupled to each other, and hard ROM and RAM 37 and 39 are directly coupled to BIOS 35. Application program 31 accesses BIOS 35 directly or through DOS 33. Application program 31 accesses BIOS 35 through DOS 33 using an interface called a BIOS interface.

Figure 4:
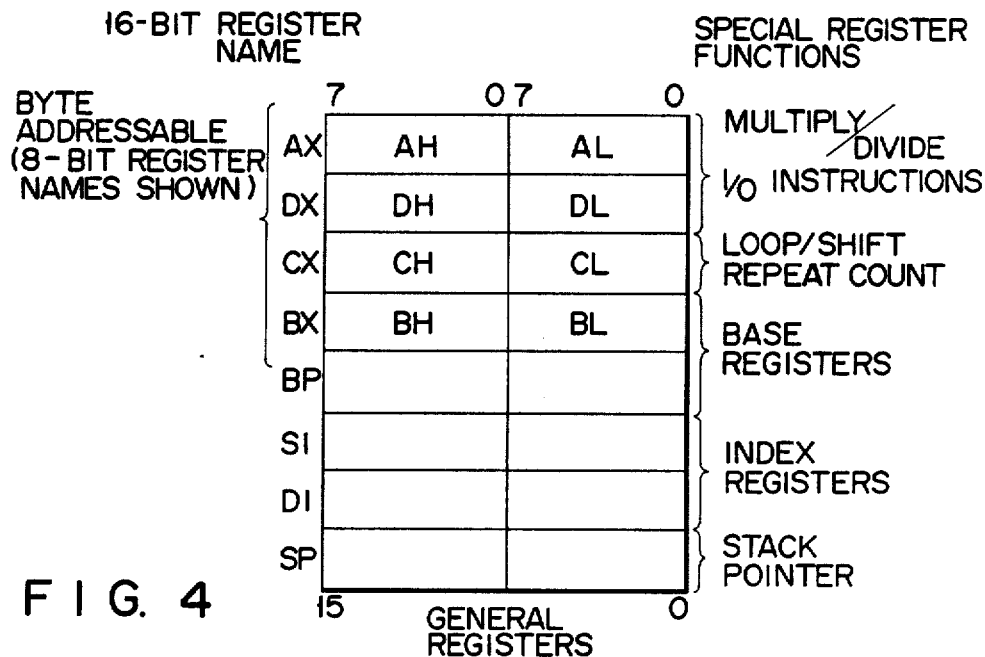
FIGS. 4 and 5 are views respectively showing general and segment registers used in the embodiment of the present invention.
Figure 5:
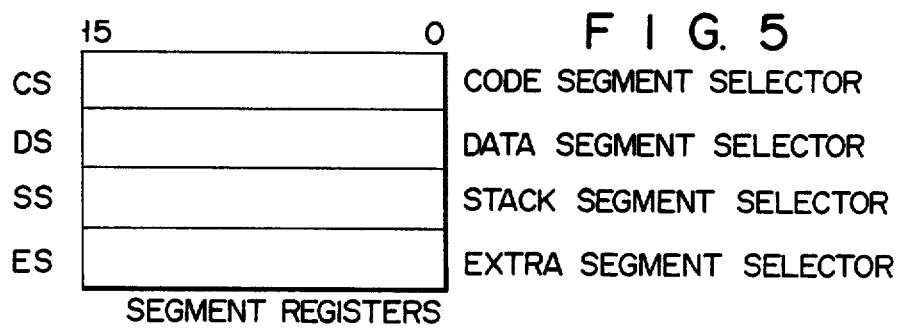

The BIOS interface is independently arranged to each peripheral apparatus (a display device, a keyboard, a printer, a disk unit, and the like). For example, in the case of IBM PCs (available from the IBM corporation, United States of America), a keyboard unit, a display device, and a disk unit are respectively started by software interrupts INT 16H, INT 10H, and INT 13H. INT 13H is commonly executed by FDD 41, HDD 43, and hard ROM 37 and hard RAM 39. When interrupt processing of INT 13H is executed, the IC disks in hard ROM 37 and hard RAM 39 are treated in the same manner as the conventional disk unit. In addition, interrupt processing of INT 13H is performed on the basis of the contents of register AH in the CPU. FIGS. 4 and 5 show, general registers AH, AL, DH, DL, CH, CL, BH, and BL, and segment registers CS, DS, SS, and ES, in, e.g., the 16-bit microprocessor 8086 system available from Intel Corporation (United States of America).

Table 1 shows a correspondence between the values and functions of the AH register. Various functions are executed by setting various hexadecimal codes as the values of the AH register, as shown in Table 1.

TABLE 1

| AH register | Function |
|---|---|
| 00 | Reset (A hard disk controller and a floppy disk controller are reset.) |
| 01 | Read status (A result status in a final operation is returned.) |
| 02 | Read sector (A designated sector is read.) |
| 03 | Write sector (A designated sector is written.) |
| 04 | Verify sector (A designated sector is verified.) |
| 05 | Format track (A designated track is formatted.) |
| 15 | Read drive type (A drive type, i.e., a floppy disk, a hard disk, an IC disk, or the like is selected.) |

For example, when the function of read drive type is to be executed, "15" is set in the AH register in hexadecimal notation. In addition, a drive number ("00" or "01") is set in the DL register, and INT 13H is called. As a result, a code indicating a drive type is set in the DL register.

A correspondence between the output codes set in the DL register and drive types is given as follows;

| Output: | DL = 00 (no drive) |
|---|---|
| | DL = 01 (floppy disk) |
| | DL = 02 (hard disk) |
| | DL = 03 (IC disk) |

The function of write sector is performed as follows:

Parameters are set in the following registers, respectively, so as to call INT 13H.

| Input: | AH = 03 |
|---|---|
| | AL = write sector number |
| | DL = drive number |
| | DH = head number |
| | CH = cylinder number |
| | CL = sector number |
| | ES:BX = start memory address at which data to be written is stored |

When the parameters are set in the above manner and INT 13H is called, the number of bytes obtained by multiplying one sector (512 bytes) by the sector number set in the AL register is written from the start address designated by the ES:BX register in the drive designated by the DL register.

Figures 6, 7:
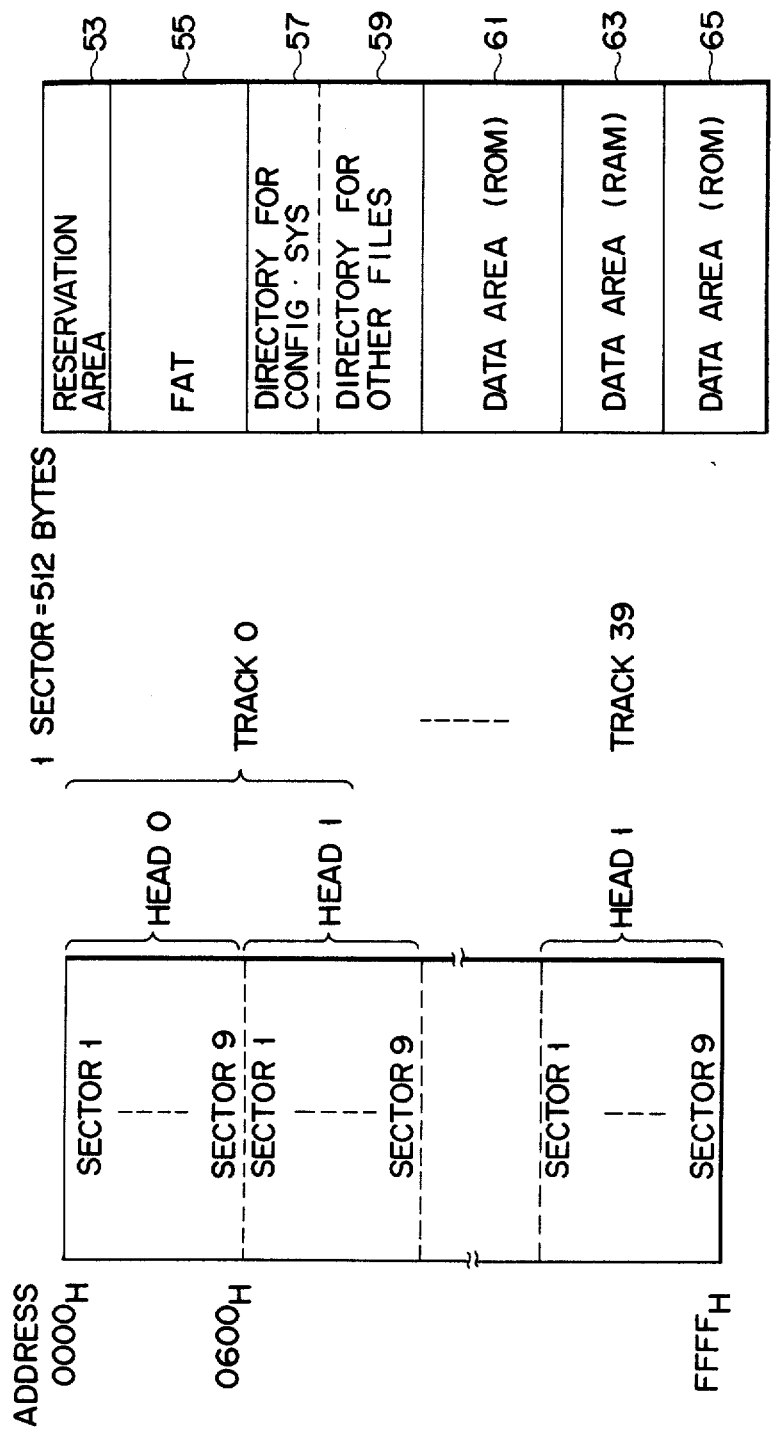
FIG. 6 is a view showing, in detail, an example of addressing of the IC disk used in the memory access control apparatus according to the present invention.
FIG. 7 is a view showing a format of the IC disk used in the memory access control apparatus according to the present invention.

As shown in FIG. 6, the IC disk can be addressed by designating the head and track as in the case of a floppy disk. As shown in FIG. 7, the format of the IC disk is the same as that of the floppy disk. Reserved area 53, file allocation table (FAT) 55, directory area 57 of a config.sys file, directory area 59 of other files, and data areas 61 and 65 are constituted by a ROM, whereas data area 63 is constituted by a RAM. The contents of system configuration file config.sys are changed to change buffer parameters and to connect an optional driver. For this reason, the config.sys area is arranged in RAM 63. BIOS 35 controls the disks (FDD, HDD, IC disk, and the like) constituting the system using corresponding drive numbers. When the drive number indicates the IC disk (DL="03"), the BIOS 35 controls the IC disk, as shown in FIG. 8. In FIG. 8, an operating system (OS), the BIOS, a buffer, and a mapping window are assigned to part of the input/output address area.

Hard ROM address 47 and hard RAM address 49 are accessed by CPU 17 through the mapping window on the input/output address area. The cylinder, head, and sector numbers assigned on memory addresses are respectively indicated by reference numeral 51. Hard ROM 37 and hard RAM 39 are basically controlled In the same manner. However, the difference is that once data is written in hard ROM 37, new data cannot be written and BIOS 35 informs an error when data is output to hard ROM 37.

Figure 9:
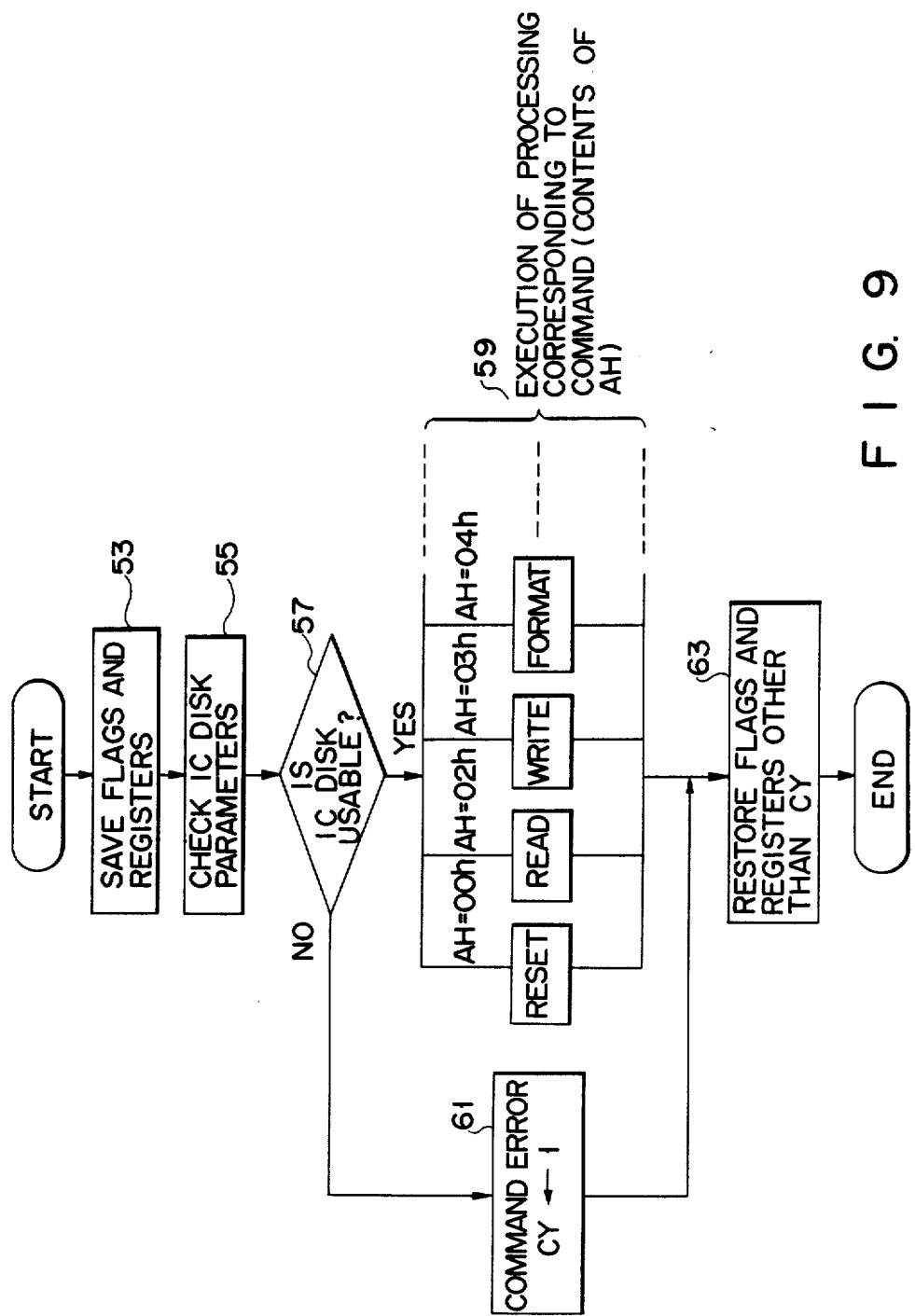
FIG. 9 is a flow chart of an operation of the embodiment in FIG. 2.

FIG. 9 shows a flow chart showing processing when BIOS 35 executes INT 13H.

BIOS 35 saves values of the flags and registers in step 53. In step 55, BIOS 35 checks IC disk parameters. In step 57, BIOS 35 checks whether the IC disk is usable. If it is determined in step 57 that the IC disk is usable, processing corresponding to a command from CPU 17 is performed. When, for example, "2" is set in register AH in CPU 17, readout of the IC disk is executed in step 59. On the other hand, when it is determined in step 57 that the IC disk is not usable, BIOS 35 informs an command error to CPU 17 by setting "1" in carry flag CY in step 61. Then, flags and registers other than carry flag CY are restored, thereby finishing the processing with respect to the IC disk.

Figure 10:
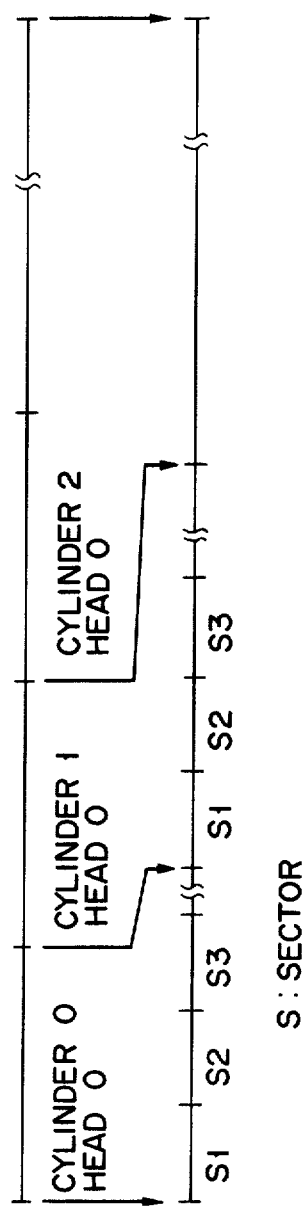
FIG. 10 is a view showing address assignment of the IC disk when it is assumed that the number of heads is one in FIG. 8; and, FIGS. 11A through 11C are views showing mapping in memories.

FIG. 10 shows an arrangement of the IC disk when the number of heads is assumed to be one. The arrangement in FIG. 10 is different from that in FIG. 8 in that the head number is only one.

Figure 11B:
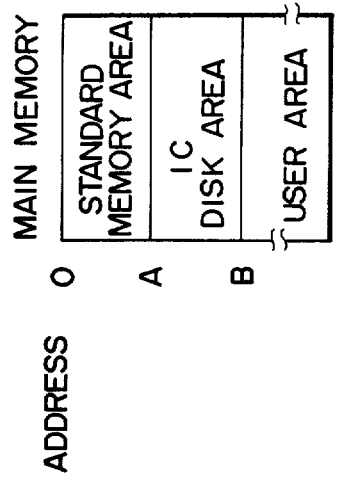
Figure 11C:
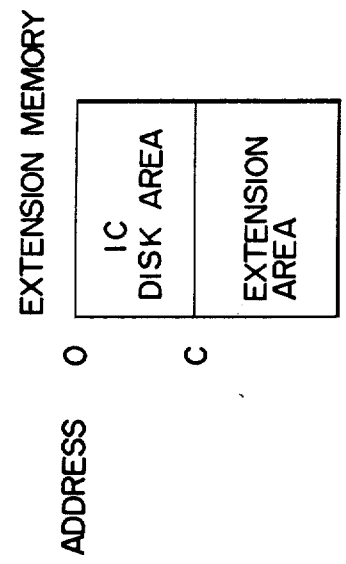
Figure 11A:
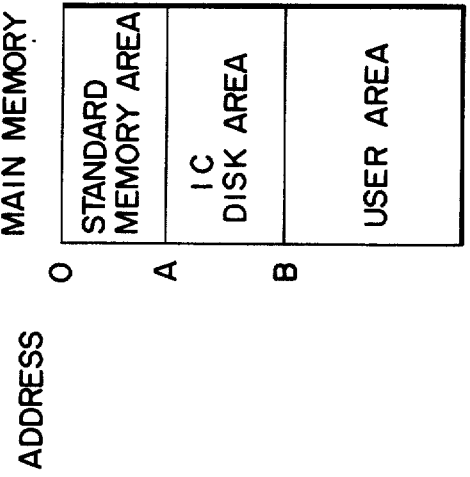

FIG. 11A shows an example of mapping in the main memory and FIGS. 11B and 11C show a case of mapping wherein an extension memory is added to the main memory. In the main memory shown in FIG. 11A, addresses 0 through A, (A+1) through B, and from (B+1) on are respectively allocated in memory areas used for a standard memory area, an IC disk area, and a user area. In the extension memory shown in FIG. 11C, addresses 0 through C, and from (C+1) on are respectively allocated in memory areas used for an IC disk area and an extension area.

In the BIOS interface, an address in the IC disk to be addressed is expressed by cylinder number+head number+sector number. Since the IC disk is essentially a continuous memory space, BIOS 35 translates an address to be accessed into a memory address on the basis of the following parameters.

| IC disk parameter | Hard ROM | Hard RAM |
| --- | --- | --- |
| Cylinder Number | 80 | 128 |

-continued

| IC disk parameter | Hard ROM | Hard RAM |
| --- | --- | --- |
| Head Number | 2 | 1 |
| Sector Number | 9 | 32 |
| Sector Length | 512 bytes | 512 bytes |
| Drive Number | 80 | 81 |
| DOS drive | C: | D: |

In this case, the address is obtained on the basis of each parameter in the following manner.

(required address) = (required cylinder number × number of heads in apparatus + head number) ×

(number of sectors per cylinder) + (required sector number)

For example, in an IC disk having 9 sectors/cylinder and 2 heads/cylinder, if an address of cylinder 0, head 0, and sector 1 is A, an address of cylinder 10, head 1, and sector 5 is calculated in the following manner.

$$(10 \times 2 + 1) \times 9 + 5 = 194$$

Therefore, (A+194) is obtained. Similarly, the number of sectors to be transferred is translated into a byte size.

When an access address and a transfer size in the IC disk are obtained, a corresponding area is mapped in a mapping window. In the read mode, data is transferred from the mapping window to a buffer, and in the write mode, from the buffer to the mapping mode. If the data transfer size is larger than the mapping window, the above processing is executed several times while the mapping address for the IC disk is shifted up or down.

What is claimed is:

1. A memory access control apparatus, comprising:
    external file units including an integrated circuit (IC) disk unit, which uses a random access memory (RAM) as part of a disk to be managed by a disk operation system, and a read only memory (ROM) as the other part of the disk, and said external file units having access address and transfer length which are represented by a format of a sector;
    means for issuing an access request to said external file units, the access request including information designating that the access request is directed to said IC disk unit;
    access request determining means for detecting that the access request is directed to said IC disk unit to output a detection signal; and
    address translating means for, in response to the detection signal output from said access request determining means, translating the sector form address into a byte form address.

2. A memory access control apparatus comprising:
    external file units including an integrated circuit (IC) disk unit, which uses a random access memory (RAM) as part of a disk to the managed by a disk operation system and a read only memory (ROM) as the other part of the disk, and said external file units having access address and transfer length which are presented by a format of a sector;
    a basic input/output system for controlling said external file units, including:
    external file managing means for assigning a number from a series of numbers to said external file units and managing said external file units by selecting external file unit to which the designated number is assigned;

parameter storing means for storing parameter for accessing said IC disk unit; and address translating means for receiving an access address and a transfer length of said IC disk unit, expressed in the sector form, and translating the access address and transfer length into a byte form address by referring to the parameters in said parameter storing means; and said memory access control apparatus further comprising memory control means for transferring data to an area corresponding to address information, translated by said basic input/output system.

3. An apparatus according to claim 2, wherein the parameters are constituted by a cylinder number, a head number, and a sector number.

4. An apparatus according to claim 2, wherein said address translating means receives cylinder, head, and sector numbers in order to translate the cylinder, head, and sector numbers into continuous memory addresses.

5. An apparatus according to claim 2, wherein said memory control means comprises a buffer and transfers, through said buffer, data to an area which corresponds to address information translated by said basic input/output system.

6. An apparatus according to claim 2, wherein said memory control means uses part of an input/output address space as a mapping window, and read data from and write data into a corresponding area of said IC disk unit by designating an address assigned to the mapping window.

7. A memory access control apparatus in a computer system for controlling a peripheral unit through a basic input/output control system, using at least part of an area assigned to an IC memory as an external file, comprising:

external file managing means, in said basic input/output control system, for assigning a number from a series of numbers to external file units including said IC memory, and managing said external file units by selecting the external file unit to which the designated number is assigned;

parameter storing means, in said basic input/output control system, for pre-storing definition information which is used when at least part of the area in said IC memory is used as said external file;

address translating means, in said basic input/output control means, for receiving an access address and a transfer length of said IC memory which is expressed in a sector form so as to translate the sector form into a byte form on the basis of the definition information; and said memory access control apparatus further comprising memory control means for transferring data to an area of said IC memory corresponding to the byte-form information translated by said basic input/output control system.

8. An apparatus according to claim 7, wherein said IC memory comprises a random access memory backed by a backup memory.

9. An apparatus according to claim 7, wherein said IC memory comprises a read only memory.

10. An apparatus according to claim 7, wherein said IC memory comprises random access and read only memories backed by a backup battery.

11. An apparatus according to claim 7, wherein the definition information is constituted by a cylinder number, a head number, and a sector number.

12. An apparatus according to claim 7, wherein said translating means receives cylinder, head, and sector numbers and translates the cylinder, head, and sector numbers into continuous memory addresses.

13. An apparatus according to claim 7, wherein said memory control means comprises a buffer, and transfers, through said buffer data to an area of said IC memory which corresponds to the address information translated by said basic input/output system through said buffer.

14. An apparatus according to claim 7, wherein said memory control means uses part of an input/output address space as a mapping window, and read data from, and write data into a corresponding area in said IC memory by designating an address assigned to the mapping window.

* * * * *